United States Patent
Yamaguchi et al.

(10) Patent No.: US 7,684,151 B2
(45) Date of Patent: Mar. 23, 2010

(54) SOFT MAGNETIC FILM AND METHOD OF MANUFACTURING SAME, THIN-FILM MAGNETIC HEAD AND METHOD OF MANUFACTURING SAME, HEAD ARM ASSEMBLY AND MAGNETIC DISK DRIVE

(75) Inventors: Atsushi Yamaguchi, Tokyo (JP); Kiyoshi Noguchi, Tokyo (JP); Kei Hirata, Tokyo (JP)

(73) Assignee: TDK Corporation, Tokyo (JP)

( * ) Notice: Subject to any disclaimer, the term of this patent is extended or adjusted under 35 U.S.C. 154(b) by 753 days.

(21) Appl. No.: 11/647,493

(22) Filed: Dec. 29, 2006

(65) Prior Publication Data
US 2007/0165330 A1 Jul. 19, 2007

(30) Foreign Application Priority Data
Jan. 13, 2006 (JP) ............................. 2006-006123

(51) Int. Cl.
*G11B 5/31* (2006.01)
(52) U.S. Cl. .................................................... 360/126
(58) Field of Classification Search .................. None
See application file for complete search history.

(56) References Cited

U.S. PATENT DOCUMENTS

| 6,120,918 | A | 9/2000 | Osaka et al. |
| 6,592,811 | B1 | 7/2003 | Saito et al. |
| 6,780,530 | B2 | 8/2004 | Saito et al. |
| 2002/0024775 | A1* | 2/2002 | Hasegawa ................... 360/314 |
| 2002/0106532 | A1 | 8/2002 | Yazawa et al. |
| 2003/0044303 | A1 | 3/2003 | Chen et al. |
| 2004/0075956 | A1* | 4/2004 | Tetsukawa et al. ....... 360/324.1 |
| 2004/0246634 | A1* | 12/2004 | Yuasa et al. ............ 360/324.11 |
| 2005/0011590 | A1 | 1/2005 | Kawasaki et al. |
| 2006/0164759 | A1* | 7/2006 | Okada et al. ................ 360/126 |

FOREIGN PATENT DOCUMENTS

| JP | B 2821456 | 8/1998 |
| JP | A 2000-187808 | 7/2000 |

(Continued)

OTHER PUBLICATIONS

Osaka, T. et al. "Controlling Microstructure of Soft Magnetic Thin Films by the Electrodeposition Method," *Journal of the Magnetics Society of Japan*, vol. 24, No. 11, pp. 1333-1341, (2000).

*Primary Examiner*—Mark Blouin
(74) *Attorney, Agent, or Firm*—Oliff & Berridge, PLC

(57) ABSTRACT

A pole layer of a magnetic head incorporates a soft magnetic film made of an iron-cobalt-nickel-base alloy. When the total of the iron, cobalt and nickel contents of the soft magnetic film is assumed as 100 weight percent, the iron content of the soft magnetic film is within a range of 42 to 90 weight percent inclusive, the cobalt content thereof is within a range of 0 to 48 weight percent inclusive, and the nickel content thereof is within a range of 10 to 20 weight percent inclusive. The soft magnetic film has a crystal structure that is a mixed crystal of a body-centered cubic structure phase and a face-centered cubic structure phase. The soft magnetic film is manufactured by performing electroplating using a plating current whose direction is alternately switched.

9 Claims, 10 Drawing Sheets

FOREIGN PATENT DOCUMENTS

| | | |
|---|---|---|
| JP | A-2001-176724 | 6/2001 |
| JP | A 2002-134318 | 5/2002 |
| JP | A 2002-217029 | 8/2002 |
| JP | A 2003-34891 | 2/2003 |
| JP | A-2005-101245 | 4/2005 |

* cited by examiner

SOFT MAGNETIC FILM AND METHOD OF MANUFACTURING SAME, THIN-FILM MAGNETIC HEAD AND METHOD OF MANUFACTURING SAME, HEAD ARM ASSEMBLY AND MAGNETIC DISK DRIVE

BACKGROUND OF THE INVENTION

1. Field of the Invention

The present invention relates to a soft magnetic film and a method of manufacturing the same and a thin-film magnetic head incorporating the soft magnetic film and a method of manufacturing the thin-film magnetic head, and to a head arm assembly and a magnetic disk drive each of which incorporates the thin-film magnetic head.

2. Description of the Related Art

Performance improvements in thin-film magnetic heads have been sought as areal recording density of magnetic disk drives has increased. A widely used type of thin-film magnetic head is a composite thin-film magnetic head that has a structure in which a write (recording) head having an induction-type electromagnetic transducer for writing and a read (reproducing) head having a magnetoresistive (MR) element for reading are stacked on a substrate.

The recording systems of magnetic disk drives include a longitudinal magnetic recording system wherein signals are magnetized in the direction along the surface of the recording medium (the longitudinal direction) and a perpendicular magnetic recording system wherein signals are magnetized in the direction orthogonal to the surface of the recording medium.

For each of the longitudinal magnetic recording system and the perpendicular magnetic recording system, a write head incorporates: a coil for generating a magnetic field corresponding to data to be written on a recording medium; and a pole layer allowing a magnetic flux corresponding to the field generated by the coil to pass therethrough and generating a write magnetic field for writing the data on the recording medium.

For the write head to achieve higher recording density, particularly required are a reduction in track width, that is, a reduction in width of the end face of the pole layer located in the medium facing surface, and an improvement in write characteristics. However, if the track width is reduced, write characteristics such as an overwrite property that is a parameter indicating an overwriting capability suffers degradation. Therefore, it is required to achieve better write characteristics as the track width is reduced.

To improve the overwrite property, it is required that the pole layer be made of a material having a high saturation flux density. It is also required that the material of the pole layer have an excellent soft magnetic characteristic, that is, a low coercivity. To be specific, it is required that the material of the pole layer have such a characteristic that the saturation flux density is 2.0 T (tesla) or higher and the coercivity is $5.0 \times 79.6$ A/m or lower.

One of known materials having a high saturation flux density is an iron-cobalt-nickel alloy. As shown in FIG. 3 of Osaka et al., "Controlling Microstructure of Soft Magnetic Thin Films by the Electrodeposition Method", Journal of The Magnetics Society of Japan, Vol. 24, No. 11, 2000, pp. 1333-1341, a bulk material of an iron-cobalt-nickel-base alloy exhibits a high saturation flux density.

Conventionally, however, it is difficult to stably achieve such a characteristic that the saturation flux density is 2.0 T or higher and the coercivity is $5.0 \times 79.6$ A/m or lower with a soft magnetic film made of an iron-cobalt-nickel-base alloy (such a soft magnetic film will be hereinafter referred to as an FeCoNi film), particularly an FeCoNi film formed by plating. The reason will be described in detail later.

Japanese Published Patent Application (hereinafter referred to as "JP-A") 2002-134318 discloses a technique of fabricating an FeCoNi film by plating using direct currents through controlling the concentrations of Fe ions, Co ions and Ni ions in a plating bath, thereby suppressing occurrences of pits and cracks in the FeCoNi film.

JP-A 2000-187808 discloses a technique of fabricating an FeCoNi film having a high saturation flux density and a low coercivity by plating through controlling the proportions of Fe, Co and Ni and the proportion of one or two elements selected from P, B, C and N.

JP-A 2002-217029 discloses a technique of fabricating an FeCoNi film having a high saturation flux density and a low coercivity by plating through using pulse currents and controlling the concentrations of Fe ions, Co ions and Ni ions in a plating bath.

JP-A 2003-34891 discloses a technique of fabricating a cobalt-iron-alloy-plated magnetic thin film or a cobalt-iron-molybdenum-alloy magnetic thin film that has a high saturation flux density by plating using bipolar pulse currents.

Japanese Patent No. 2821456 discloses a cobalt-iron-nickel magnetic thin film that is fabricated by electroplating, contains 40 to 70 weight percent cobalt, 20 to 40 weight percent iron, and 10 to 20 weight percent nickel, and has a crystal structure that is a mixed crystal of a γ phase having a body-centered cubic structure and an α phase having a face-centered cubic structure.

As previously described, it is conventionally difficult to stably achieve such a characteristic that the saturation flux density is 2.0 T or higher and the coercivity is $5.0 \times 79.6$ A/m or lower with an FeCoNi film formed by plating. The reason will now be described.

It is possible to increase the saturation flux density of an FeCoNi film by increasing the iron content thereof. For an FeCoNi film formed by plating, however, if the iron content is increased, the amount of impurities taken into the FeCoNi film increases, and it is therefore difficult to make the saturation flux density as high as that of a bulk material. It is possible to improve the soft magnetic characteristics of an FeCoNi film by optimizing the impurities content of the FeCoNi film. However, the saturation flux density of the FeCoNi film decreases if the impurities content thereof increases.

As shown in FIG. 3 and FIG. 7 of Osaka et al. mentioned previously, an FeCoNi film having a saturation flux density of 2.0 T or higher typically has a body-centered cubic crystal structure. Therefore, an FeCoNi film having a body-centered cubic crystal structure easily has a high saturation flux density. However, in such an FeCoNi film, crystal grains are likely to be enlarged and the soft magnetic characteristics are thereby likely to be degraded.

In the case of forming an FeCoNi film by plating using direct currents as disclosed in JP-A 2002-134318, the soft magnetic characteristics of the FeCoNi film are likely to be degraded because the crystal grains are likely to be enlarged in the film, and furthermore, it is difficult to obtain a saturation flux density as high as that of a bulk material because a large amount of impurities are taken into the FeCoNi film. The technique disclosed in JP-A 2000-187808 also seems to use direct currents in plating, and it is therefore difficult through this technique, too, to obtain an FeCoNi film having a saturation flux density as high as that of a bulk material. Actually, as is clear from comparison between FIG. 2 of JP-A 2000-187808 and FIG. 3 of Osaka et al., the saturation flux density of the FeCoNi film fabricated through the technique of JP-A 2000-187808 is lower than that of a bulk material.

In the case of forming an FeCoNi film by plating using pulse currents as disclosed in JP-A 2002-217029, it is possible to reduce enlargement of crystal grains and the amount of impurities taken into the film, compared with the case of forming an FeCoNi film by plating using direct currents. However, if comparison is made between FIG. 8 of JP-A 2002-217029 and FIG. 3 of Osaka et al., it is noted that some of the FeCoNi films fabricated through the technique of JP-A 2002-217029 have a saturation flux density lower than that of a bulk material. Furthermore, as shown in FIG. 9 of JP-A 2002-217029, compositions of the FeCoNi film fabricated through the technique disclosed in this publication that allow the coercivity of the film to be 5.0×79.6 A/m or lower are limited to a very narrow range. Because of the foregoing, it is also difficult by using the technique disclosed in JP-A 2002-217029 to stably achieve such a characteristic of an FeCoNi film that the saturation flux density is 2.0 T or higher and the coercivity is 5.0×79.6 A/m or lower.

FIG. 6 of JP-A 2003-34891 shows the relationship between the composition and the easy axis coercivity of a cobalt-iron-molybdenum alloy formed through the technique disclosed in this publication. As shown in FIG. 6 of this publication, there are few cobalt-iron-molybdenum alloys having a coercivity of 7×79.6 A/m or lower while most cobalt-iron-molybdenum alloys have a coercivity higher than 7×79.6 A/m.

Furthermore, as can be seen from FIG. 3 of Osaka et al., it is difficult to achieve a saturation flux density of 2.0 T or higher with a cobalt-iron-nickel magnetic thin film having a composition within the range disclosed in Japanese Patent No. 2821456.

OBJECT AND SUMMARY OF THE INVENTION

It is an object of the invention to provide a soft magnetic film that is capable of stably achieving a characteristic of being high in saturation flux density and low in coercivity, a method of manufacturing such a soft magnetic film, a thin-film magnetic head incorporating the soft magnetic film and a method of manufacturing such a thin-film magnetic head, and to provide a head arm assembly and a magnetic disk drive each of which incorporates the thin-film magnetic head.

A soft magnetic film of the invention is made of an alloy whose principal elements are at least iron and nickel among the group consisting of iron, cobalt and nickel. When the total of iron, cobalt and nickel contents of the soft magnetic film is assumed as 100 weight percent, the iron content of the soft magnetic film is within a range of 42 to 90 weight percent inclusive, the cobalt content thereof is within a range of 0 to 48 weight percent inclusive, and the nickel content thereof is within a range of 10 to 20 weight percent inclusive. The soft magnetic film of the invention has a crystal structure that is a mixed crystal of a body-centered cubic structure phase and a face-centered cubic structure phase.

According to the soft magnetic film of the invention, because of the feature that its crystal structure is a mixed crystal of a body-centered cubic structure phase and a face-centered cubic structure phase, it is possible to stably achieve a characteristic of being high in saturation flux density and low in coercivity.

In the soft magnetic film of the invention, when the total of iron, cobalt and nickel contents of the soft magnetic film is assumed as 100 weight percent, the content of elements other than iron, cobalt and nickel in the soft magnetic film may be 0.5 weight percent or lower.

A method of manufacturing a soft magnetic film of the invention is provided for manufacturing a soft magnetic film made of an alloy whose principal elements are at least iron and nickel among the group consisting of iron, cobalt and nickel. When the total of iron, cobalt and nickel contents of the soft magnetic film is assumed as 100 weight percent, the iron content of the soft magnetic film is within a range of 42 to 90 weight percent inclusive, the cobalt content thereof is within a range of 0 to 48 weight percent inclusive, and the nickel content thereof is within a range of 10 to 20 weight percent inclusive. The soft magnetic film has a crystal structure that is a mixed crystal of a body-centered cubic structure phase and a face-centered cubic structure phase. The method of the invention includes the step of manufacturing the soft magnetic film by performing electroplating using a plating current whose direction is alternately switched.

According to the method of manufacturing the soft magnetic film of the invention, performing electroplating using a plating current whose direction is alternately switched makes it possible to provide a soft magnetic film having a crystal structure that is a mixed crystal of a body-centered cubic structure phase and a face-centered cubic structure phase. It is thereby possible for the soft magnetic film to stably achieve a characteristic of being high in saturation flux density and low in coercivity.

In the method of manufacturing the soft magnetic film of the invention, when the total of iron, cobalt and nickel contents of the soft magnetic film is assumed as 100 weight percent, the content of elements other than iron, cobalt and nickel in the soft magnetic film may be 0.5 weight percent or lower.

In the method of manufacturing the soft magnetic film of the invention, it is preferred that the plating current be such one that a current in a first direction that functions so that the alloy precipitates at the cathode and a current in a second direction opposite to the first direction are alternately switched, and that a time quadrature value of the current in the first direction be greater than that of the current in the second direction.

A thin-film magnetic head of the invention includes: a medium facing surface that faces toward a recording medium; a coil for generating a magnetic field corresponding to data to be written on the recording medium; and a pole layer allowing a magnetic flux corresponding to the field generated by the coil to pass therethrough, and generating a write magnetic field for writing the data on the recording medium. The pole layer incorporates the soft magnetic film of the invention.

A method of manufacturing a thin-film magnetic head of the invention is provided for manufacturing a thin-film magnetic head including: a medium facing surface that faces toward a recording medium; a coil for generating a magnetic field corresponding to data to be written on the recording medium; and a pole layer allowing a magnetic flux corresponding to the field generated by the coil to pass therethrough, and generating a write magnetic field for writing the data on the recording medium. The method includes the steps of: forming the coil; and forming the pole layer. The pole layer incorporates a soft magnetic film made of an alloy whose principal elements are at least iron and nickel among the group consisting of iron, cobalt and nickel. The soft magnetic film is manufactured through the method of manufacturing a soft magnetic film of the invention.

A head arm assembly of the invention includes: a slider including the thin-film magnetic head of the invention and disposed to face toward a recording medium; a suspension flexibly supporting the slider; and an arm for making the slider travel across tracks of the recording medium, the suspension being attached to the arm.

A magnetic disk drive of the invention includes: a slider including the thin-film magnetic head of the invention and disposed to face toward a recording medium that is driven to rotate; and an alignment device supporting the slider and aligning the slider with respect to the recording medium.

According to the soft magnetic film or the method of manufacturing the same of the invention, it is possible to obtain a soft magnetic film that has the above-described composition and a crystal structure that is a mixed crystal of a body-centered cubic structure phase and a face-centered cubic structure phase, and is capable of stably achieving a characteristic of being high in saturation flux density and low in coercivity.

According to the thin-film magnetic head or the method of manufacturing the same, the head arm assembly, or the magnetic disk drive of the invention, it is possible to provide a thin-film magnetic head including a pole layer capable of stably achieving a characteristic of being high in saturation flux density and low in coercivity, or to provide a head arm assembly or a magnetic disk drive each of which incorporates the thin-film magnetic head.

Other and further objects, features and advantages of the invention will appear more fully from the following description.

DETAILED DESCRIPTION OF THE PREFERRED EMBODIMENT

Figure 1:
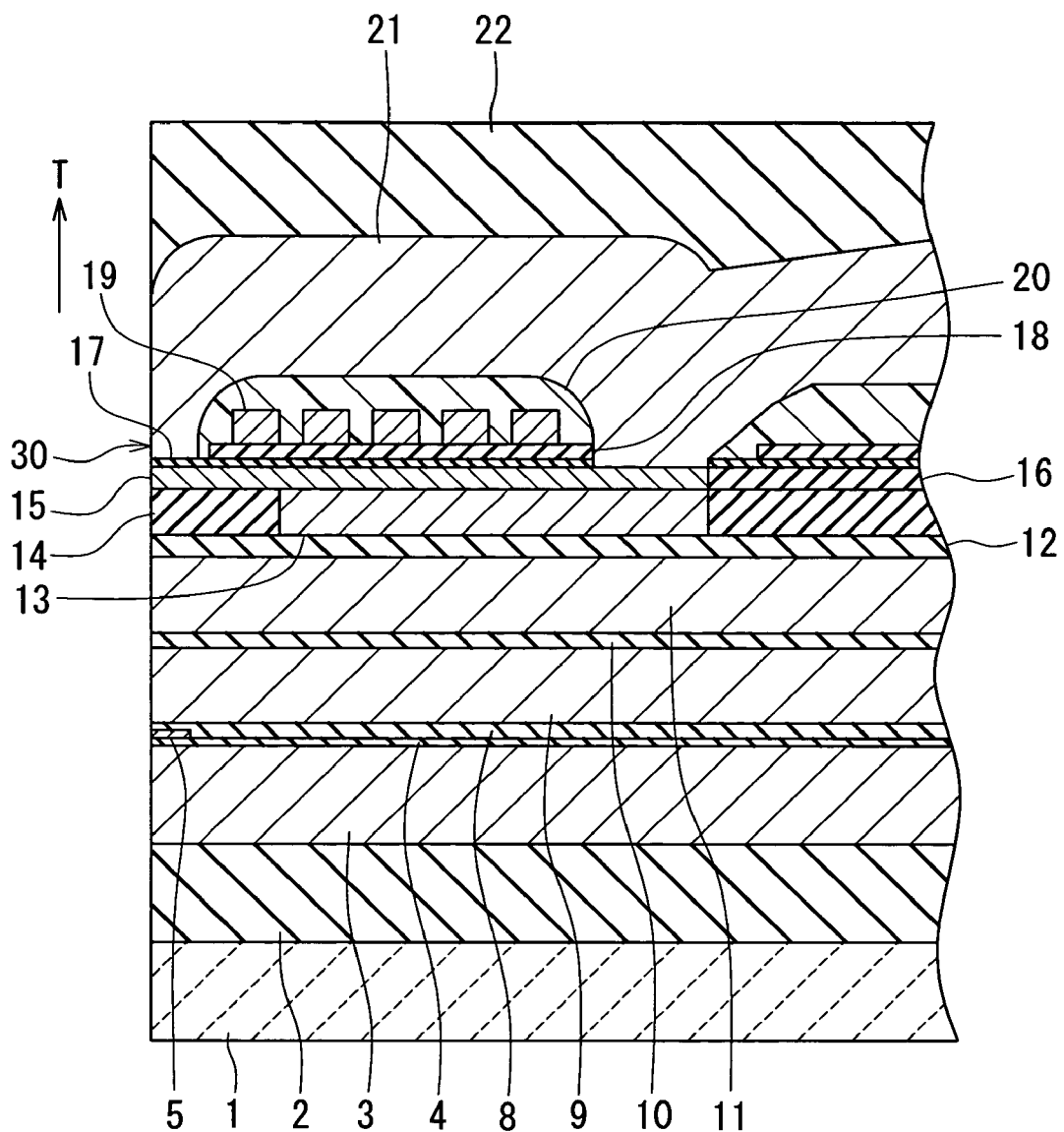
FIG. 1 is a cross-sectional view for illustrating the configuration of a thin-film magnetic head of an embodiment of the invention.
Figure 2:
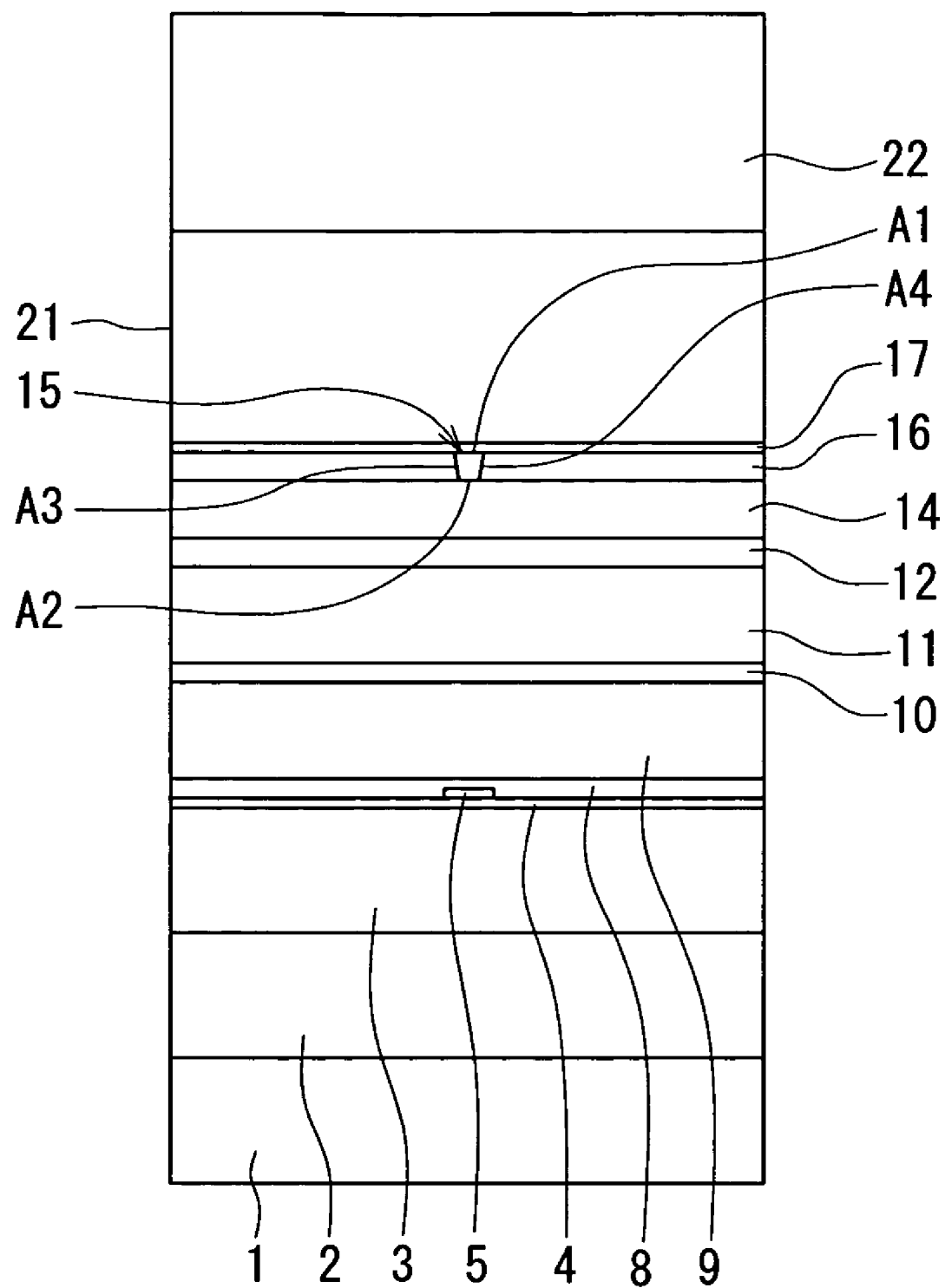
FIG. 2 is a front view of the medium facing surface of the magnetic head of FIG. 1.

A preferred embodiment of the invention will now be described in detail with reference to the accompanying drawings. Reference is now made to FIG. 1 and FIG. 2 to describe the configuration of a thin-film magnetic head of the embodiment of the invention. The thin-film magnetic head of the embodiment is one for perpendicular magnetic recording. FIG. 1 is a cross-sectional view illustrating the configuration of the thin-film magnetic head of the embodiment. FIG. 1 illustrates a cross section orthogonal to the medium facing surface and the plane of a substrate. The arrow indicated with T in FIG. 1 shows the direction of travel of a recording medium. FIG. 2 is a front view illustrating the medium facing surface of the thin-film magnetic head of the embodiment.

As shown in FIG. 1 and FIG. 2, the thin-film magnetic head (hereinafter simply called the magnetic head) of the embodiment incorporates: a substrate 1 made of a ceramic such as aluminum oxide and titanium carbide ($Al_2O_3$—TiC); an insulating layer 2 made of an insulating material such as alumina ($Al_2O_3$) and disposed on the substrate 1; a first read shield layer 3 made of a magnetic material and disposed on the insulating layer 2; an insulating layer 4 disposed on the first read shield layer 3; a magnetoresistive (MR) element 5 as a read element disposed on the insulating layer 4; an insulating layer 8 disposed to cover the MR element 5 and the insulating layer 4; and a second read shield layer 9 made of a magnetic material and disposed on the insulating layer 8.

The MR element 5 has an end that is located in a medium facing surface 30 that faces toward a recording medium. The MR element 5 may be an element made of a magneto-sensitive film that exhibits a magnetoresistive effect, such as an anisotropic magnetoresistive (AMR) element, a giant magnetoresistive (GMR) element, or a tunnel magnetoresistive (TMR) element. The GMR element may be of a current-in-plane (CIP) type wherein a current used for detecting magnetic signals is fed in the direction nearly parallel to the plane of each layer making up the GMR element, or may be of a current-perpendicular-to-plane (CPP) type wherein a current used for detecting magnetic signals is fed in the direction nearly perpendicular to the plane of each layer making up the GMR element.

The magnetic head further incorporates: a nonmagnetic layer 10 made of a nonmagnetic material such as alumina and disposed on the second read shield layer 9; and a middle magnetic layer 11 made of a magnetic material and disposed on the nonmagnetic layer 10. The portions from the first read shield layer 3 to the middle magnetic layer 11 make up a read head. The middle magnetic layer 11 has a function of a read shield layer and a function of an auxiliary pole of a write head that will be described later.

The magnetic head further incorporates: a nonmagnetic layer 12 made of a nonmagnetic material such as alumina and disposed on the middle magnetic layer 11; a yoke layer 13 made of a magnetic material and disposed on the nonmagnetic layer 12; and a nonmagnetic layer 14 made of a non-conductive and nonmagnetic material such as alumina and disposed around the yoke layer 13. An end of the yoke layer 13 closer to the medium facing surface 30 is located at a distance from the medium facing surface 30. The yoke layer 13 and the nonmagnetic layer 14 have flattened top surfaces.

The magnetic head further incorporates: a pole layer 15 made of a magnetic material and disposed on the top surfaces of the yoke layer 13 and the nonmagnetic layer 14; and a nonmagnetic layer 16 made of a nonconductive and nonmagnetic material such as alumina and disposed around the pole layer 15. A bottom surface of the pole layer 15 touches the top surface of the yoke layer 13. The pole layer 15 and the nonmagnetic layer 16 have flattened top surfaces.

The magnetic head further incorporates: a gap layer 17 disposed on the pole layer 15 and the nonmagnetic layer 16; a nonmagnetic layer 18 made of a nonconductive and nonmagnetic material such as alumina and formed on a region of the gap layer 17 where a coil 19 described later will be disposed; the coil 19 disposed on the nonmagnetic layer 18; and an insulating layer 20 formed to cover the coil 19. The coil 19 is flat-whorl-shaped. The gap layer 17 has an opening located in a region corresponding to the center of the coil 19. The insulating layer 20 is not exposed in the medium facing surface 30. The gap layer 17 may be a nonmagnetic conductive layer.

The magnetic head further incorporates a write shield layer 21 made of a magnetic material and disposed on the pole layer 15, the gap layer 17 and the insulating layer 20. The write shield layer 21 is coupled to the pole layer 15 through the opening of the gap layer 17. An end of the write shield layer 21 closer to the medium facing surface 30 is located in the medium facing surface 30. The portions from the nonmagnetic layer 12 to the write shield layer 21 make up a write head.

The magnetic head further incorporates a protection layer 22 made of an insulating material such as alumina and formed to cover the write shield layer 21.

As described so far, the magnetic head of the embodiment incorporates the medium facing surface 30 that faces toward a recording medium, the read head and the write head. The read head is disposed backward in the direction T of travel of the recording medium (that is, closer to the air inflow end of the slider). The write head is disposed forward in the direction T of travel of the recording medium (that is, closer to the air outflow end of the slider). The magnetic head writes data on the recording medium through the use of the write head and reads data stored on the medium through the use of the read head.

The read head incorporates: the MR element 5 as a read element; and the first read shield layer 3 and the second read shield layer 9 for shielding the MR element 5. The MR element 5 is disposed near the medium facing surface 30 and reads data written on the recording medium by means of the perpendicular magnetic recording system.

The write head incorporates the pole layer 15, the gap layer 17, the coil 19, and the write shield layer 21. The coil 19 generates a magnetic field corresponding to data to be written on the recording medium. The pole layer 15 has an end face located in the medium facing surface 30. The pole layer 15 allows a magnetic flux corresponding to the field generated by the coil 19 to pass therethrough and generates a write magnetic field for writing data on the medium by means of the perpendicular magnetic recording system. The write shield layer 21 has an end face located in the medium facing surface 30. A portion of the write shield layer 21 located away from the medium facing surface 30 is coupled to the pole layer 15. The gap layer 17 has an end face located in the medium facing surface 30, and is provided between the pole layer 15 and the write shield layer 21.

At least part of the coil 19 is disposed between the pole layer 15 and the write shield layer 21 and insulated from the pole layer 15 and the write shield layer 21. The pole layer 15, the yoke layer 13 and the write shield layer 21 form a magnetic path that allows the magnetic flux corresponding to the magnetic field generated by the coil 19 to pass.

In the medium facing surface 30, the end face of the write shield layer 21 is located forward of the end face of the pole layer 15 in the direction T of travel of the recording medium (that is, closer to the air outflow end of the slider) with a specific space created by the thickness of the gap layer 17. The end face of the write shield layer 21 has a width greater than that of the end face of the pole layer 15. The end face of the write shield layer 21 has an area greater than that of the end face of the pole layer 15. The write shield layer 21 is capable of making the magnetic field gradient abrupt by taking in a magnetic flux generated from the end face of the pole layer 15. In addition, the write shield layer 21 has a function of returning a magnetic flux that has been generated from the end face of the pole layer 15 and that has magnetized the recording medium. Furthermore, the write shield layer 21 takes in unwanted expanding components of the returning flux generated from the end face of the pole layer 15 before the components reach the recording medium, and thereby functions as a magnetic shield.

Figure 3:
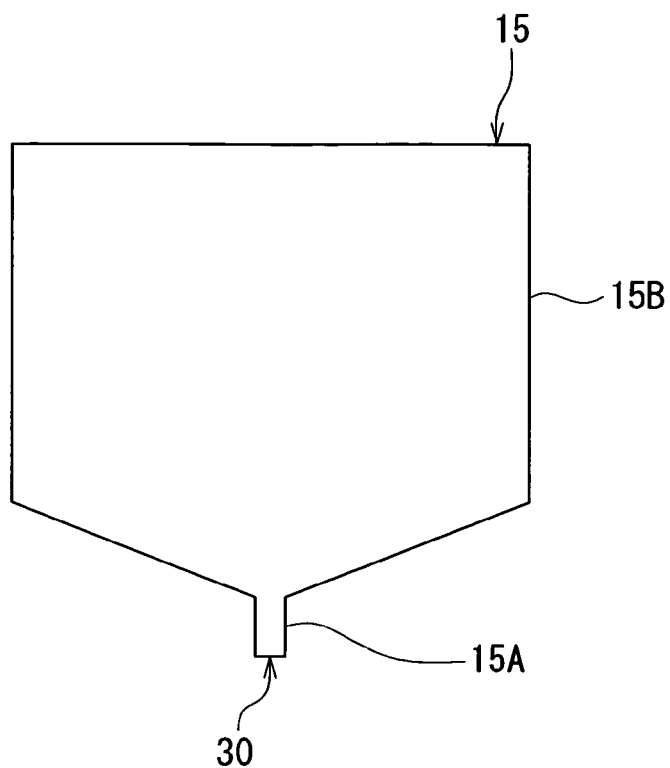
FIG. 3 is a top view of the pole layer of the magnetic head of FIG. 1.

Reference is now made to FIG. 3 to describe the shape of the pole layer 15 in detail. FIG. 3 is a top view of the pole layer 15. As shown in FIG. 3, the pole layer 15 incorporates a track width defining portion 15A and a wide portion 15B that is located away from the medium facing surface 30 and coupled to the track width defining portion 15A. The track width defining portion 15A has an end face that is located in the medium facing surface 30 and that defines a track width. The top surface of the track width defining portion 15A has a nearly uniform width. For example, the wide portion 15B is equal in width to the track width defining portion 15A at the interface with the track width defining portion 15A, and gradually increases in width as the distance from the medium facing surface 30 increases and then maintains a specific width to the end of the wide portion 15B. Here, the length of the track width defining portion 15A orthogonal to medium facing surface 30 is called a neck height.

The track width, that is, the width of the top surface of the track width defining portion 15A taken in the medium facing surface 30 is within a range of 0.08 to 0.30 μm inclusive, for example. The neck height is within a range of 0.05 to 0.5 μm inclusive, for example. The maximum width of the wide portion 15B is within a range of 5 to 30 μm inclusive, for example. The pole layer 15 preferably has a thickness within a range of 0.15 to 0.4 μm inclusive, for example.

As shown in FIG. 2, the end face of the pole layer 15 (the track width defining portion 15A) located in the medium facing surface 30 has a shape of trapezoid that has: a first side A1 farthest from the substrate 1; a second side A2 opposite to the first side A1; a third side A3 connecting an end of the first side A1 to an end of the second side A2; and a fourth side A4 connecting the other end of the first side A1 to the other end of the second side A2. The first side A1 defines the track width. The width of the end face of the pole layer 15 decreases as the distance from the second side A2 decreases, that is, as the distance from the substrate 1 decreases. As a result, it is possible to suppress a phenomenon in which, when data is written on a specific track, data stored on an adjacent track is erased because of a skew. The skew is a tilt of the magnetic head with respect to the tangent of the circular track of a circular-plate-shaped recording medium. The end face of the pole layer 15 may be rectangle-shaped or square-shaped.

Alternatively, the end face of the pole layer 15 may have a shape of a triangle without the second side A2.

A variety of modifications of the magnetic head of the embodiment are possible, as will now be described. First, it is not necessarily required that the yoke layer 13 be provided. Alternatively, the yoke layer 13 may be provided on the top of the pole layer 15 or may be provided on the top and at the bottom of the pole layer 15. Furthermore, in place of the flat-whorl-shaped coil 19, a coil wound around the pole layer 15 in a helical manner may be provided. Alternatively, flat-whorl-shaped coils may be provided on the top and at the bottom of the pole layer 15, respectively. The write shield layer 21 may be made up of two or more layers.

A recording medium used in a magnetic disk drive incorporating the magnetic head of the embodiment incorporates, for example, a substrate, and a horizontally magnetized layer and a perpendicularly magnetized layer that are stacked on the substrate in this order. The perpendicularly magnetized layer is a layer in which data is stored. The horizontally magnetized layer is a layer that forms a magnetic path through which a magnetic flux passes.

A method of manufacturing the magnetic head of the embodiment will now be described. In this method, first, the insulating layer 2 and the first read shield layer 3 are formed one by one on the substrate 1. Next, the insulating layer 4, the MR element 5 and the insulating layer 8 are formed one by one on the first read shield layer 3. Next, the second read shield layer 9 is formed on the insulating layer 8. Next, the nonmagnetic layer 10, the middle magnetic layer 11 and the nonmagnetic layer 12 are formed one by one on the second read shield layer 9.

Next, the yoke layer 13 is formed on the nonmagnetic layer 12. Next, the nonmagnetic layer 14 is formed to cover the yoke layer 13. The nonmagnetic layer 14 is then polished by chemical mechanical polishing (CMP), for example, so that the top surface of the yoke layer 13 is exposed. The top surfaces of the yoke layer 13 and the nonmagnetic layer 14 are thereby flattened.

Next, the pole layer 15 is formed on the top surfaces of the yoke layer 13 and the nonmagnetic layer 14. Next, the nonmagnetic layer 16 is formed to cover the pole layer 15. The nonmagnetic layer 16 is then polished by CMP, for example, so that the top surface of the pole layer 15 is exposed. The top surfaces of the pole layer 15 and the nonmagnetic layer 16 are thereby flattened.

Next, the gap layer 17 and the nonmagnetic layer 18 are formed one by one on the pole layer 15 and the nonmagnetic layer 16. Next, the coil 19 is formed on the nonmagnetic layer 18. Next, the insulating layer 20 is formed to cover the coil 19. Next, the write shield layer 21 is formed on the pole layer 15, the gap layer 17 and the insulating layer 20. Next, the protection layer 22 is formed to cover the write shield layer 21.

Wiring and terminals are then formed on the protection layer 22, the substrate is cut into sliders, and the steps including polishing of the medium facing surface 30 and fabrication of flying rails are performed. The magnetic head is thus completed.

The pole layer 15 incorporates a soft magnetic film of the embodiment. The soft magnetic film of the embodiment will now be described in detail. The soft magnetic film is made of an alloy whose principal elements are at least iron and nickel among the group consisting of iron (Fe), cobalt (Co) and nickel (Ni). When the total of the iron, cobalt and nickel contents of the soft magnetic film is assumed as 100 weight percent, the iron content of the soft magnetic film is within a range of 42 to 90 weight percent inclusive, the cobalt content thereof is within a range of 0 to 48 weight percent inclusive, and the nickel content thereof is within a range of 10 to 20 weight percent inclusive. The soft magnetic film of the embodiment has a crystal structure that is a mixed crystal of a body-centered cubic structure phase and a face-centered cubic structure phase.

When the total of the iron, cobalt and nickel contents of the soft magnetic film is assumed as 100 weight percent, the content of elements contained in the soft magnetic film other than iron, cobalt and nickel (such elements will be hereinafter called impurity elements) is preferably 0.5 weight percent or lower. Impurity elements may be hydrogen (H), boron (B), carbon (C), nitrogen (N), oxygen (O), sulfur (S), and phosphorus (P), for example. The soft magnetic film contains no metallic elements other than iron, cobalt and nickel.

The soft magnetic film of the embodiment has a saturation flux density of 2.0 T or higher. The coercivity of the soft magnetic film in the direction of hard axis is 5.0×79.6 A/m or lower.

A method of manufacturing the soft magnetic film of the embodiment will now be described. The method includes the step of manufacturing the soft magnetic film by performing electroplating using plating currents whose direction is alternately switched.

The plating bath used in the embodiment contains, for example, iron sulfate heptahydrate (whose concentration is 10 to 60 g/L), cobalt sulfate heptahydrate (whose concentration is 0 to 30 g/L), nickel sulfate hexahydrate (whose concentration is 10 to 50 g/L), boric acid (whose concentration is 27 g/L), ammonium sulfide (whose concentration is 20 g/L), ammonium chloride (whose concentration is 5 g/L), sodium saccharin (whose concentration is 0.5 g/L), and sodium lauryl sulfate (whose concentration is 0.01 g/L). The pH of the plating bath is 2.2 to 2.4, for example. The anode used for electroplating is made of nickel, for example. It is possible to control each of the iron, cobalt and nickel contents of the soft magnetic film by changing the concentration and proportion of each of iron sulfate heptahydrate, cobalt sulfate heptahydrate, and nickel sulfate hexahydrate in the plating bath.

Although the source of iron, cobalt and nickel in the above-mentioned example of plating bath is sulfate, the source may be any other salt such as a chloride salt or sulfamate. Although ammonium sulfide and ammonium chloride are used as the conductive salt in the above-mentioned example of plating bath, any other salt such as sodium sulfate or sodium chloride may be used as the conductive salt.

In the method of manufacturing the soft magnetic film of the embodiment, it is preferred that the plating current be such one that a current in a first direction that functions so that the alloy precipitates at the cathode and a current in a second direction opposite to the first direction are alternately switched, and that the time quadrature value of the current in the first direction be greater than that of the current in the second direction. It is thereby possible to promote the growth of the soft magnetic film with reliability.

Figure 8:
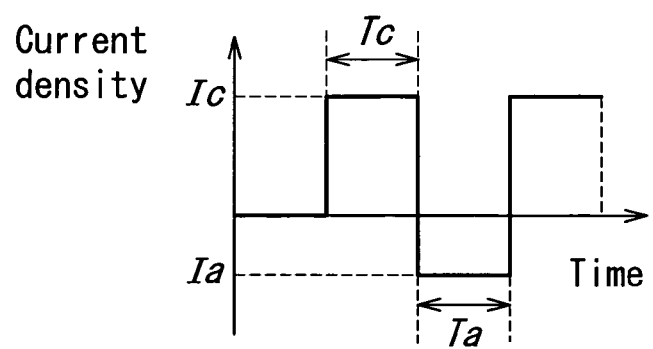
FIG. 8 is a view for illustrating an example of waveform of a plating current of the embodiment of the invention.

FIG. 8 illustrates an example of waveform of the plating current of the embodiment. In FIG. 8 the horizontal axis indicates time while the vertical axis indicates current density. In this example, the waveform of the plating current is rectangular. In FIG. 8 the current density obtained when the potential at the anode is higher than the potential at the cathode is indicated with a positive value while the current density obtained when the potential at the cathode is higher than the potential at the anode is indicated with a negative value. When the potential at the anode is higher than the potential at the cathode, the current flows in the direction from the anode toward the cathode in the plating bath. This direction is the first direction mentioned above. The current in the first direction functions so that the alloy precipitates or is reduced at the cathode. When the potential at the cathode is higher than the potential at the anode, the current flows in the direction opposite to the first direction. This direction is the second direction mentioned above. The current in the second direction functions so that the alloy that has precipitated at the cathode is dissolved or oxidized. The plating current of the example illustrated in FIG. 8 is such one that the current in the first direction and the current in the second direction are alternately switched. In addition, the time quadrature value of current density of the current in the first direction is greater than that of the current in the second direction. The plating current having a waveform shown in FIG. 8 will be hereinafter called a bipolar pulse current.

In the waveform of the plating current shown in FIG. 8, the peak value of current density of the current in the first direction is defined as Ic, the duration of the current in the first direction at one time is defined as Tc, the peak value of current density of the current in the second direction is defined as Ia, and the duration of the current in the second direction at one time is defined as Ta. Ic is 25 to 35 mA/cm$^2$, for example. Tc is 25 milliseconds, for example. Ia is 10 mA/cm$^2$, for example. Ta is 15 milliseconds, for example. It is possible to control each of the iron, cobalt and nickel contents of the soft magnetic film of the embodiment also by changing at least one of Ic and Ia.

Figure 9:
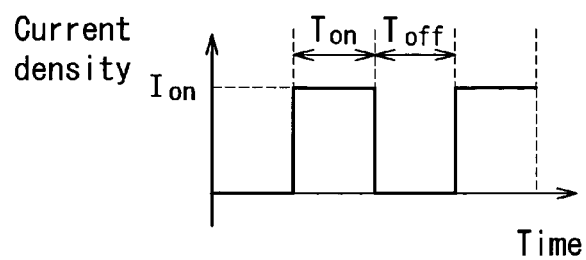
FIG. 9 is a view for illustrating a waveform of a reference plating current for comparison with the plating current of the embodiment of the invention.

FIG. 9 illustrates a waveform of a reference plating current for comparison with the plating current of the embodiment of the invention. In FIG. 9 the horizontal axis indicates time while the vertical axis indicates current density. The plating current of FIG. 9 is a pulse-shaped current wherein there is no change in direction. The waveform of this plating current is rectangular. This plating current flows in the direction from the anode toward the cathode in the plating bath. This plating current exhibits a current-flowing state and a non-current-flowing state alternately. The plating current having a waveform shown in FIG. 9 will be hereinafter called a normal pulse current.

In the waveform of the plating current shown in FIG. 9, the peak value of current density in the current-flowing state is defined as I$_{on}$, the duration of the current-flowing state at one time is defined as T$_{on}$, and the duration of the non-current-flowing state at one time is defined as T$_{off}$. I$_{on}$ is 25 to 35 mA/cm$^2$, for example. T$_{on}$ is 50 milliseconds, for example. T$_{off}$ is 50 milliseconds, for example.

Referring to results of an experiment, the features of the soft magnetic film and the method of manufacturing the same of the embodiment will be described in detail. In the experiment, plating films of first to tenth examples of the embodiment and first to eighth reference examples were fabricated by performing electroplating using the plating bath previously mentioned and the bipolar pulse current of FIG. 8, while changing the metallic ion concentration in the plating bath and the current density Ic of the bipolar pulse current. The plating films of the first to tenth examples are examples of the soft magnetic film of the embodiment. In the experiment, furthermore, a plating film of a ninth reference example was fabricated by electroplating using the plating bath previously mentioned and the normal pulse current of FIG. 9. Each of the plating films of the first to tenth examples of the embodiment and the first to ninth reference examples had a thickness of 1 µm.

For each of the plating films of the first to tenth examples of the embodiment and the first to ninth reference examples, the table below shows the type of plating current when fabricated, the iron (Fe), cobalt (Co) and nickel (Ni) contents (weight percent), saturation flux density Bs (T), coercivity in the direction of hard axis Hch (Oe), and the crystal structure. 1 Oe is 79.6 A/m. Under the "plating current" column in the table, "bipolar" means that the plating current is a bipolar pulse current, and "normal" means that the plating current is a normal pulse current. The values of each of the iron, cobalt and nickel contents listed are relative to the total of the iron, cobalt and nickel contents of the plating film, which is assumed as 100 weight percent. Under the "crystal structure" column, "bcc+fcc" means a mixed crystal of a body-centered cubic structure phase and a face-centered cubic structure phase, and "bcc" means a body-centered cubic structure.

TABLE 1

|  | Plating current | Fe content | Co content | Ni content | Bs | Hch | Crystal structure |
|---|---|---|---|---|---|---|---|
| Example 1 | Bipolar | 80.7 | 0.0 | 19.3 | 2.01 | 2.1 | bcc + fcc |
| Example 2 | Bipolar | 82.5 | 0.0 | 17.5 | 2.05 | 2.2 | bcc + fcc |
| Example 3 | Bipolar | 74.7 | 13.1 | 12.2 | 2.18 | 3.6 | bcc + fcc |
| Example 4 | Bipolar | 79.9 | 10.0 | 10.1 | 2.16 | 3.1 | bcc + fcc |
| Example 5 | Bipolar | 67.3 | 17.5 | 15.2 | 2.07 | 2.1 | bcc + fcc |
| Example 6 | Bipolar | 60.7 | 28.4 | 10.9 | 2.21 | 4.5 | bcc + fcc |
| Example 7 | Bipolar | 50.2 | 39.2 | 10.6 | 2.20 | 4.2 | bcc + fcc |
| Example 8 | Bipolar | 55.3 | 30.4 | 14.3 | 2.17 | 3.2 | bcc + fcc |
| Example 9 | Bipolar | 65.3 | 21.3 | 13.4 | 2.18 | 3.7 | bcc + fcc |
| Example 10 | Bipolar | 42.4 | 38.1 | 19.5 | 2.01 | 3.3 | bcc + fcc |
| Reference 1 | Bipolar | 56.5 | 39.4 | 4.1 | 2.26 | 5.9 | bcc |
| Reference 2 | Bipolar | 62.3 | 35.3 | 2.4 | 2.30 | 6.5 | bcc |
| Reference 3 | Bipolar | 67.4 | 30.9 | 1.7 | 2.28 | 7.5 | bcc |
| Reference 4 | Bipolar | 60.2 | 37.0 | 2.8 | 2.27 | 6.1 | bcc |
| Reference 5 | Bipolar | 66.5 | 27.2 | 6.3 | 2.21 | 5.5 | bcc |
| Reference 6 | Bipolar | 92.1 | 0.0 | 7.9 | 2.00 | 3.6 | bcc |
| Reference 7 | Bipolar | 87.2 | 5.6 | 7.2 | 2.10 | 5.1 | bcc |
| Reference 8 | Bipolar | 82.6 | 10.9 | 6.5 | 2.12 | 6.2 | bcc |
| Reference 9 | Normal | 75.3 | 12.9 | 11.8 | 2.06 | 5.8 | bcc |

Figure 10:
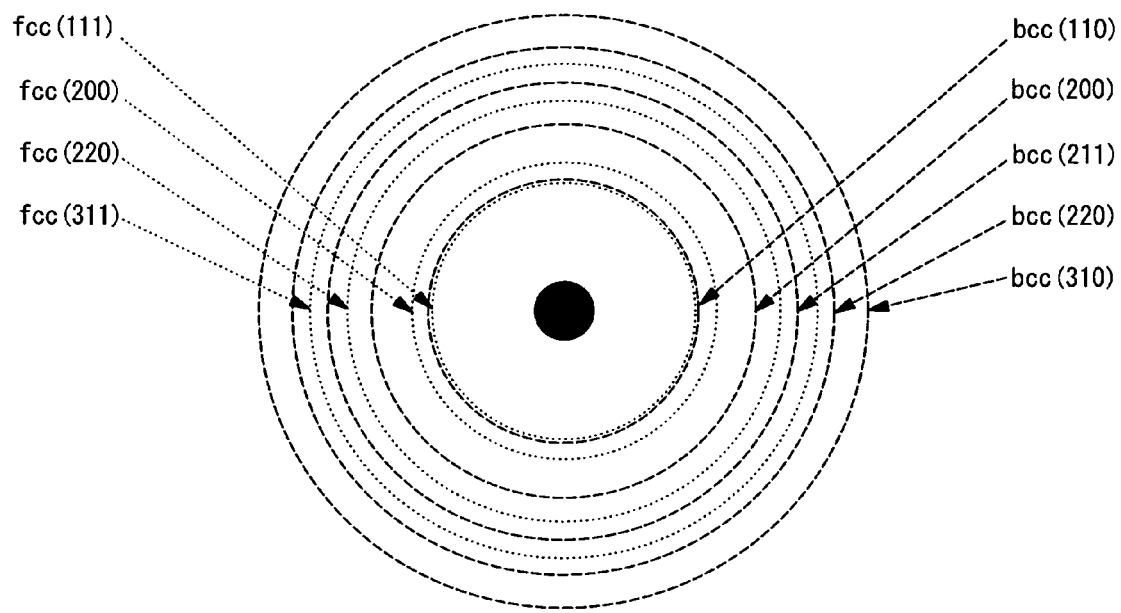
FIG. 10 is a view for describing a method for determining the crystal structure of a plating film used in an experiment.

Reference is now made to FIG. 10 to describe a method of determining the crystal structure of each of the plating films used in the experiment. In the experiment, the crystal structure of each of the plating films was determined by observing the electron diffraction pattern of the film with a transmission electron microscope. FIG. 10 shows an example of electron diffraction image of an iron-cobalt-nickel-base alloy. In the following description the lattice plane of Miller indices (hkl) in the body-centered cubic structure phase is indicated as bcc (hkl), and the lattice plane of Miller indices (hkl) in the face-centered cubic structure phase is indicated as fcc (hkl). The electron diffraction image of FIG. 10 includes electron diffraction patterns corresponding to bcc (110), bcc (200), bcc (211), bcc (220), bcc (310), fcc (111), fcc (200), fcc (220), and fcc (311), respectively, that are in the form of concentric circles.

Interplanar spacing "d" is expressed by the following equation:

$$d = \lambda L/R$$

where R is the distance (radius) from the center of diffraction pattern of FIG. 10, λ is the wavelength of an electron beam, and L is the camera length.

Since λL is a value inherent in the transmission electron microscope, it is possible to obtain the interplanar spacing d from the equation above by measuring the distance R from the center of each of the diffraction patterns of FIG. 10.

The table below lists the theoretical interplanar spacing of each of the above-mentioned lattice planes of the iron-cobalt-nickel-base alloy.

TABLE 2

| Lattice plane | Interplanar spacing (nm) | Lattice plane | Interplanar spacing (nm) |
|---|---|---|---|
| bcc (110) | 0.203 | fcc (111) | 0.208 |
| bcc (200) | 0.143 | fcc (200) | 0.180 |
| bcc (211) | 0.117 | fcc (220) | 0.127 |
| bcc (220) | 0.101 | fcc (311) | 0.108 |
| bcc (310) | 0.090 | | |

In the experiment, it was confirmed that the interplanar spacing d calculated from each of the diffraction patterns of FIG. 10 was nearly equal to the theoretical interplanar spacing. In consideration of this, diffraction patterns of each of the plating films fabricated in the experiment were observed, and when any of the diffraction patterns of FIG. 10 was found, it was determined that there existed a crystal structure corresponding to the diffraction pattern. As shown in FIG. 10 and the table above, the interplanar spacing of bcc (110) and that of fcc (111) are nearly equal, and it is therefore difficult to distinguish the diffraction patterns of bcc (110) and fcc (111) from each other. Such being the case, in the experiment, it was determined that there existed a face-centered cubic structure phase when the diffraction pattern of fcc (200) was found. Since it was clear that there existed a body-centered cubic structure phase in the composition range of the plating films fabricated in the experiment, when it was impossible to identify whether a diffraction pattern was of bcc (110) or fcc (111), it was determined that the diffraction pattern was of bcc (110).

For the plating films of the third example of the embodiment and the ninth reference example, the table below shows sulfur (S), carbon (C) and oxygen (O) contents of each film in weight percent where the total of the iron, cobalt and nickel contents of each film is assumed as 100 weight percent.

TABLE 3

| | S content | C content | O content |
|---|---|---|---|
| Example 3 | 0.19 | 0.0087 | 0.0034 |
| Reference 9 | 0.34 | 0.20 | 0.027 |

With regard to iron, cobalt and nickel, the composition of the plating film of the third example is nearly equal to that of the plating film of the ninth reference example. However, the content of each of sulfur, carbon and oxygen that are predominant impurity elements is much smaller in the plating film of the third example than in the plating film of the ninth reference example. This indicates that it is possible through fabricating the plating film using bipolar pulse currents to make the content of impurity elements less, compared with the case of fabricating the plating film using normal pulse currents.

Figure 11:
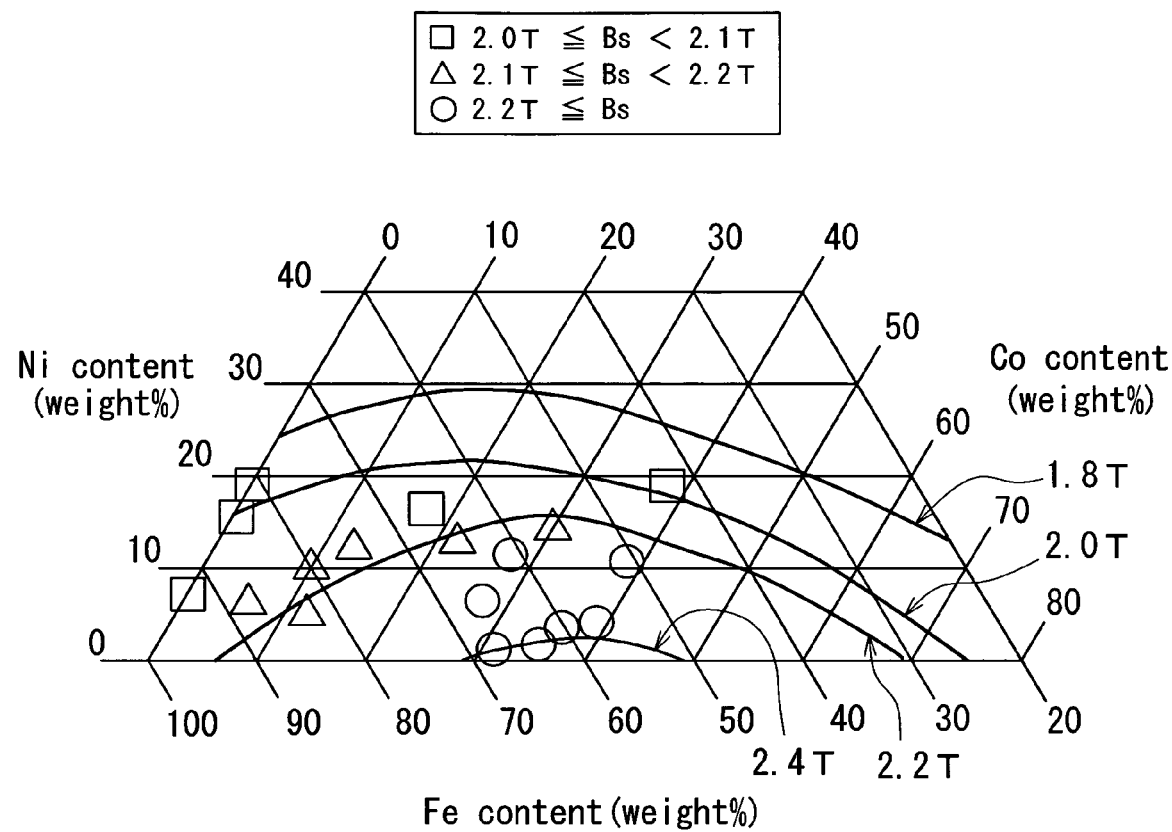
FIG. 11 is a plot for illustrating the relationship between the saturation flux density and the iron, cobalt and nickel contents for each of plating films of examples of the embodiment and plating films of reference examples fabricated in the experiment.

FIG. 11 shows the relationship between the saturation flux density Bs (T) and the iron (Fe), cobalt (Co) and nickel (Ni) contents (weight percent) for the plating films of the first to tenth examples of the embodiment and the first to eighth reference examples that were fabricated using bipolar pulse currents. In FIG. 11 each square indicates the composition of the plating film having a saturation flux density Bs equal to or higher than 2.0 T and lower than 2.1 T. Each delta indicates the composition of the plating film having a saturation flux density Bs equal to or higher than 2.1 T and lower than 2.2 T. Each circle indicates the composition of the plating film having a saturation flux density Bs equal to or higher than 2.2 T. FIG. 11 also shows curves indicating the compositions of bulk materials of iron-cobalt-nickel-base alloy whose saturation flux densities are 1.8 T, 2.0 T, 2.2 T and 2.4 T, respectively.

As shown in FIG. 11, the saturation flux densities of the plating films of the first to tenth examples of the embodiment and the first to eighth reference examples are nearly equal to the saturation flux densities of the bulk materials. It is considered that this is because those plating films were fabricated using bipolar pulse currents so that capture of impurity elements was suppressed. FIG. 11 also indicates that it is possible to obtain a saturation flux density Bs of 2.0 T or higher with a plating film made of an alloy whose principal elements are at least iron and nickel among the group consisting of iron, cobalt and nickel wherein the iron content is 42 weight percent or higher, and the nickel content is 20 weight percent or lower.

Figure 12:
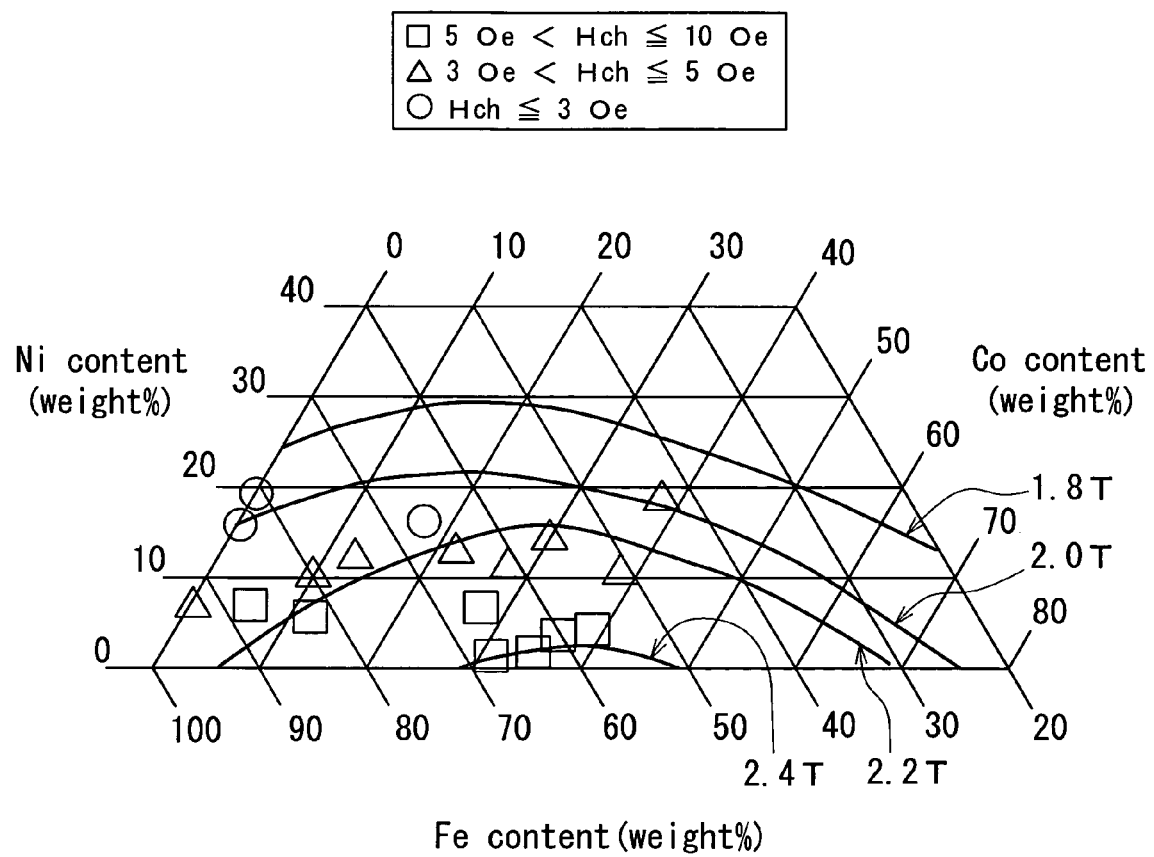
FIG. 12 is a plot for illustrating the relationship between the coercivity and the iron, cobalt and nickel contents for each of the plating films of the examples of the embodiment and the plating films of the reference examples fabricated in the experiment.

FIG. 12 shows the relationship between the coercivity Hch (Oe) in the direction of hard axis and the iron (Fe), cobalt (Co) and nickel (Ni) contents (weight percent) for the plating films of the first to tenth examples of the embodiment and the first to eighth reference examples that were fabricated using bipolar pulse currents. In FIG. 12 each square indicates the composition of the plating film having a coercivity Hch higher than 5 Oe and lower than or equal to 10 Oe. Each delta indicates the composition of the plating film having a coercivity Hch higher than 3 Oe and lower than or equal to 5 Oe. Each circle indicates the composition of the plating film having a coercivity Hch lower than or equal to 3 Oe. FIG. 12 also shows curves indicating the compositions of bulk materials of iron-cobalt-nickel-base alloy whose saturation flux densities are 1.8 T, 2.0 T, 2.2 T and 2.4 T, respectively.

FIG. 12 indicates that, for a plating film made of an alloy whose principal elements are at least iron and nickel among the group consisting of iron, cobalt and nickel, if the nickel content is lower than 10 weight percent, the coercivity Hch of the plating film is higher than 5 Oe, which results in degradation of the soft magnetic characteristics of the plating film.

Figure 13:
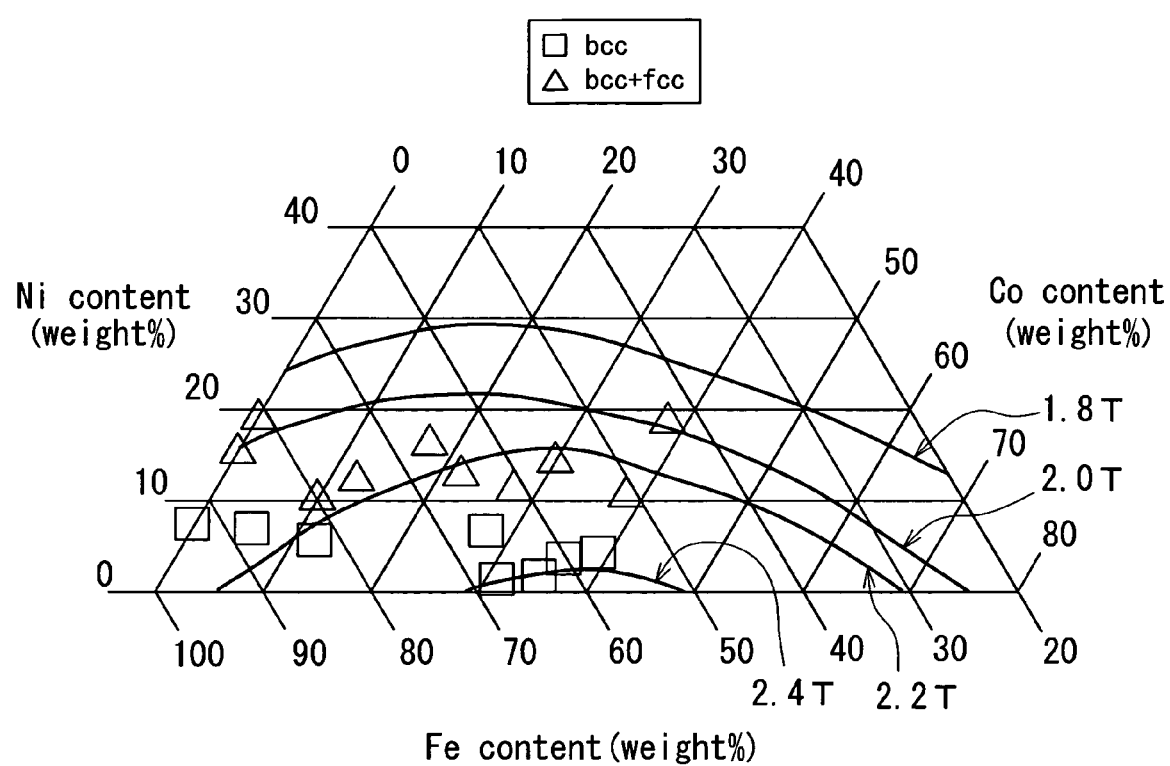
FIG. 13 is a plot for illustrating the relationship between the crystal structure and the iron, cobalt and nickel contents for each of the plating films of the examples of the embodiment and the plating films of the reference examples fabricated in the experiment.

FIG. 13 shows the relationship between the crystal structure and the iron (Fe), cobalt (Co) and nickel (Ni) contents (weight percent) for the plating films of the first to tenth examples of the embodiment and the first to eighth reference examples that were fabricated using bipolar pulse currents. In FIG. 13 each square indicates the composition of the plating film having a body-centered cubic (bcc) crystal structure. Each delta indicates the composition of the plating film having a crystal structure that is a mixed crystal of a body-centered cubic structure phase and a face-centered cubic structure phase (bcc+fcc). FIG. 13 also shows curves indicating the compositions of bulk materials of iron-cobalt-nickel-base alloy whose saturation flux densities are 1.8 T, 2.0 T, 2.2 T and 2.4 T, respectively.

FIG. 13 indicates that, in the case of fabricating a plating film made of an alloy whose principal elements are at least iron and nickel among the group consisting of iron, cobalt and nickel through the use of bipolar pulse currents, it is possible to make the crystal structure of the plating film a mixed crystal of a body-centered cubic structure phase and a face-centered cubic structure phase in a composition range wherein the nickel content is equal to or higher than 10 weight percent and lower than 20 weight percent, and the iron content is 42 weight percent or higher.

As can be seen from comparison between FIG. 12 and FIG. 13, a coercivity Hch of 5 Oe or lower is obtained in such a composition range that the crystal structure of the plating film is a mixed crystal of a body-centered cubic structure phase and a face-centered cubic structure phase. It is considered that this is because, in the plating film having such a crystal structure, crystal grains are prevented from being enlarged and made finer, so that the coercivity as low as 5 Oe or lower is obtained.

Figure 14:
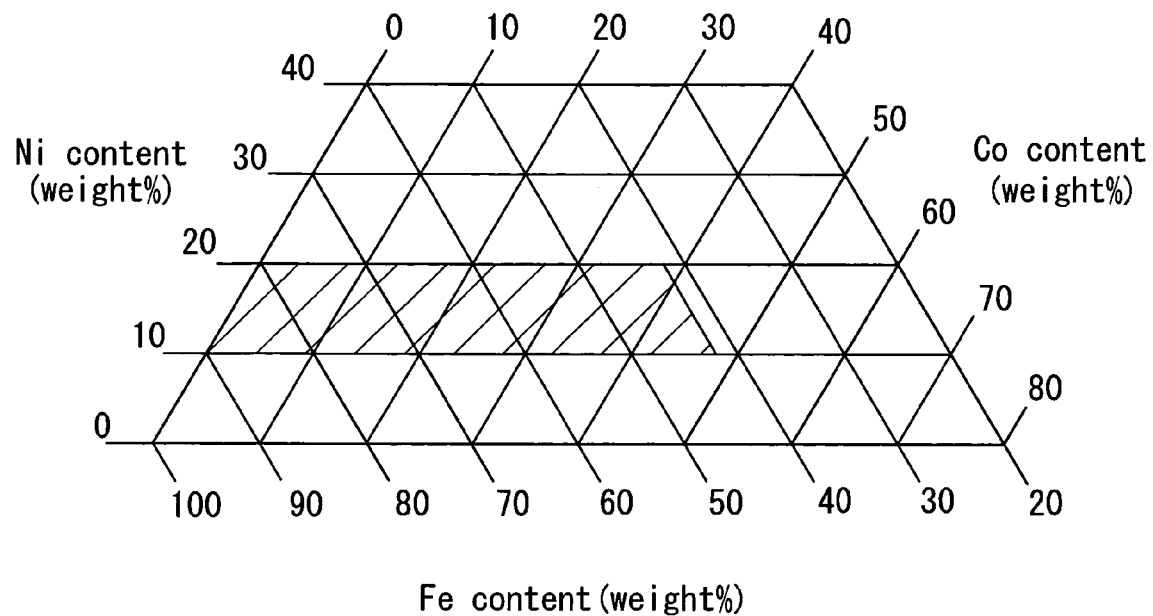
FIG. 14 is a view for illustrating the composition range of the soft magnetic film of the embodiment of the invention.

The foregoing results of the experiment teach that, a plating film (soft magnetic film) having a composition within the composition range of the soft magnetic film of the embodiment and having a crystal structure that is a mixed crystal of a body-centered cubic structure phase and a face-centered cubic structure phase can stably achieve such a characteristic that the saturation flux density Bs is 2.0 T or higher and the coercivity Hch in the direction of hard axis is 5.0×79.6 A/m or lower. FIG. 14 shows the composition range of the soft magnetic film of the embodiment, which is indicated with hatching.

In the embodiment, to obtain the saturation flux density Bs of 2.0 T or higher with higher reliability, it is preferred that, when the total of the iron, cobalt and nickel contents of the soft magnetic film is assumed as 100 weight percent, the iron content be within 50 to 90 weight percent inclusive, the cobalt content be within 0 to 40 weight percent inclusive, and the nickel content be within 10 to 20 weight percent inclusive. It is more preferred that the iron content be within 50 to 70 weight percent inclusive, the cobalt content be within 10 to 40 weight percent inclusive, and the nickel content be within 10 to 20 weight percent inclusive.

In the composition range of the soft magnetic film of the embodiment, the crystal structure of the soft magnetic film is typically a body-centered cubic structure if the soft magnetic film is fabricated by electroplating using direct currents or normal pulse currents as plating currents. According to the method of manufacturing the soft magnetic film of the embodiment, by performing electroplating using a plating current whose direction is alternately switched, it is possible to obtain a soft magnetic film having a composition within the composition range of the soft magnetic film of the embodiment and having a crystal structure that is a mixed crystal of a body-centered cubic structure phase and a face-centered cubic structure phase. The reason will now be described in detail.

In the case of manufacturing a soft magnetic film using a plating current whose direction is alternately switched, when the plating current is in the second direction, an anodic (oxidation) reaction occurs at the cathode, and iron and cobalt in particular dissolve from the alloy that has precipitated at the cathode. As a result, a nickel-base face-centered cubic structure phase appears in the soft magnetic film made of the above-mentioned alloy. Thus, the crystal structure of the soft magnetic film manufactured through the method of the embodiment is such that the primary phase is a body-centered cubic structure phase but a very small portion of face-centered cubic structure phase is included. It is considered that the crystal growth is suppressed and the coercivity Hch is reduced in this soft magnetic film for the reason that the crystal structure of the film is a mixed crystal of a body-centered cubic structure phase and a face-centered cubic structure phase. If the nickel content of the soft magnetic film is too low, a nickel-base face-centered cubic structure phase will not appear in the soft magnetic film even though the soft magnetic film is manufactured by using a plating current whose direction is alternately switched. The results of the experiment shown in FIG. 13 indicate that a nickel content of 10 weight percent or higher is required so as to allow a nickel-base face-centered cubic structure phase to appear in the soft magnetic film.

According to the method of manufacturing the soft magnetic film of the embodiment, it is possible to reduce the content of impurity elements in the soft magnetic film by performing electroplating using a plating current whose direction is alternately switched. A possible reason will now be described. In the case of manufacturing the soft magnetic film using a plating current whose direction is alternately switched, when the plating current is in the second direction, an anodic (oxidation) reaction occurs at the cathode, and iron and cobalt dissolve and impurity elements are removed. As a result, uptake of impurity elements by the alloy that has precipitated at the cathode is more greatly suppressed, compared with the case of manufacturing the soft magnetic film using a plating current whose direction is not changed. As thus described, according to the method of manufacturing the soft magnetic film of the embodiment, it is possible to reduce the content of impurity elements in the soft magnetic film, so that it is possible to achieve the soft magnetic film having the saturation flux density Bs as high as that of a bulk material.

Figure 15:
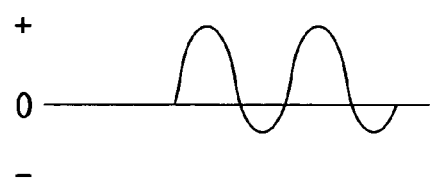
FIG. 15 is a view for illustrating another example of waveform of the plating current of the embodiment of the invention.

The plating current of the embodiment is not limited to the one having a waveform shown in FIG. 8 but may be any other sort of plating current whose direction is alternately switched. The waveform of the plating current of the embodiment may be one shown in FIG. 15, for example. In FIG. 15 the horizontal axis indicates time while the vertical axis indicates current density. The waveform of the plating current of FIG. 15 is of sine waves wherein the peak value of current density obtained when the current density is positive is greater than the peak value of current density obtained when the current density is negative. In the embodiment, it is possible to obtain effects similar to those obtained when the plating current is one having a waveform of FIG. 8 even if the plating current is one having a waveform other than the one shown in FIG. 8 as long as the direction of the current is alternately switched.

As described so far, according to the soft magnetic film or the method of manufacturing the same of the embodiment, it is possible to obtain a soft magnetic film capable of stably achieving a characteristic of being high in saturation flux density and low in coercivity. According to the magnetic head or the method of manufacturing the same of the embodiment, it is possible to obtain a magnetic head incorporating a pole layer capable of stably achieving a characteristics of being high in saturation flux density and low in coercivity.

Figure 4:
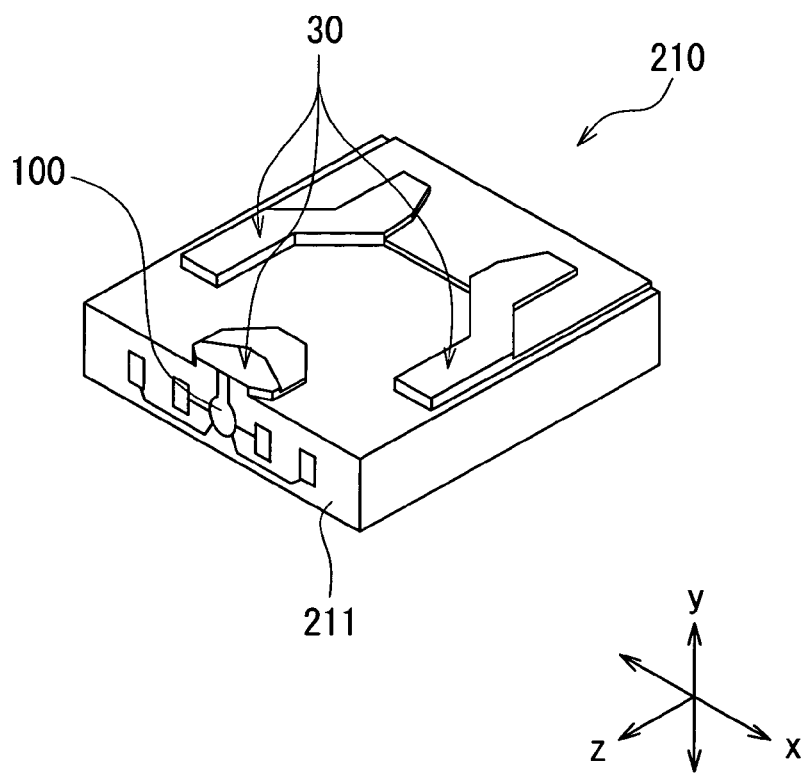
FIG. 4 is a perspective view illustrating a slider incorporating the magnetic head of FIG. 1.

A slider, a head gimbal assembly, a head arm assembly and a magnetic disk drive each of which incorporates the magnetic head shown in FIG. 1 and FIG. 2 will now be described. Reference is made to FIG. 4 to describe the slider 210. In the magnetic disk drive the slider 210 is placed to face toward a magnetic disk platter that is a circular-plate-shaped recording medium to be driven to rotate. The slider 210 has a base body 211 made up mainly of the substrate 1 and the protection layer 22 of FIG. 1. The base body 211 is nearly hexahedron-shaped. One of the six surfaces of the base body 211 faces toward the magnetic disk platter. The medium facing surface (air bearing surface) 30 is formed in this one of the surfaces. When the magnetic disk platter rotates in the z direction of FIG. 4, an airflow passes between the magnetic disk platter and the slider 210, and a lift is thereby generated below the slider 210 in the y direction of FIG. 4 and exerted on the slider 210. The slider 210 flies over the magnetic disk platter by means of the lift. The x direction of FIG. 4 is across the tracks of the magnetic disk platter. A thin-film magnetic head 100 of the embodiment is formed near the air-outflow-side end (the end located at the lower left of FIG. 4) of the slider 210.

Figure 5:
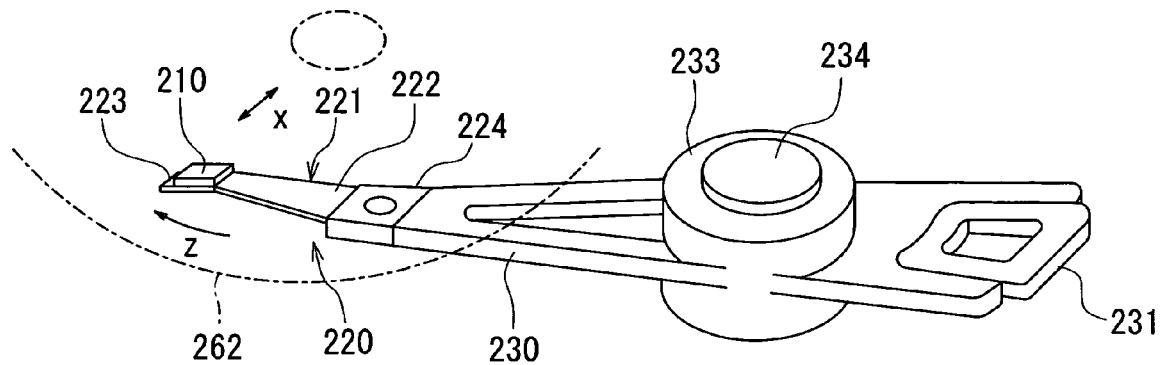
FIG. 5 is a perspective view illustrating a head arm assembly incorporating the slider of FIG. 4.

Reference is now made to FIG. 5 to describe the head gimbal assembly 220. The head gimbal assembly 220 incorporates the slider 210 and a suspension 221 that flexibly supports the slider 210. The suspension 221 incorporates: a plate-spring-shaped load beam 222 made of stainless steel, for example; a flexure 223 to which the slider 210 is joined, the flexure 223 being located at an end of the load beam 222 and giving an appropriate degree of freedom to the slider 210; and a base plate 224 located at the other end of the load beam 222. The base plate 224 is attached to an arm 230 of an actuator for moving the slider 210 along the x direction across the tracks of the magnetic disk platter 262. The actuator incorporates the arm 230 and a voice coil motor that drives the arm 230. A gimbal section for maintaining the orientation of the slider 210 is provided in the portion of the flexure 223 on which the slider 210 is mounted.

The head gimbal assembly 220 is attached to the arm 230 of the actuator. An assembly comprising the arm 230 and the head gimbal assembly 220 attached to the arm 230 is called a head arm assembly. An assembly comprising a carriage having a plurality of arms wherein the head gimbal assembly 220 is attached to each of the arms is called a head stack assembly.

FIG. 5 illustrates the head arm assembly. In the head arm assembly the head gimbal assembly 220 is attached to an end of the arm 230. A coil 231 that is part of the voice coil motor is fixed to the other end of the arm 230. A bearing 233 is provided in the middle of the arm 230. The bearing 233 is attached to an axis 234 that rotatably supports the arm 230.

Figure 6:
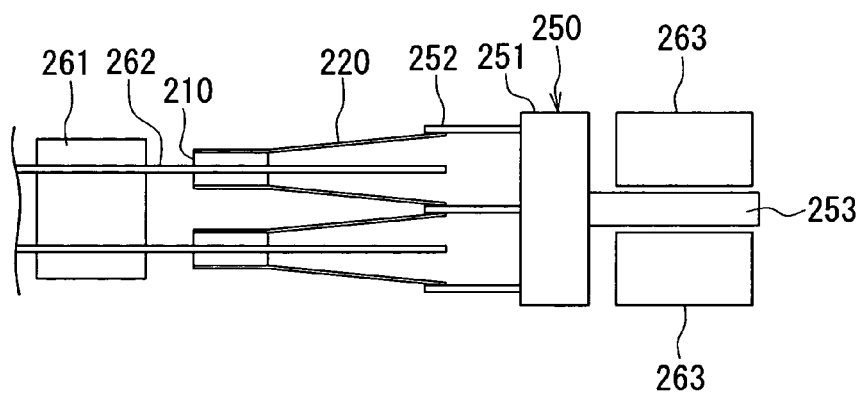
FIG. 6 is a view for illustrating a main part of a magnetic disk drive incorporating the slider of FIG. 4.
Figure 7:
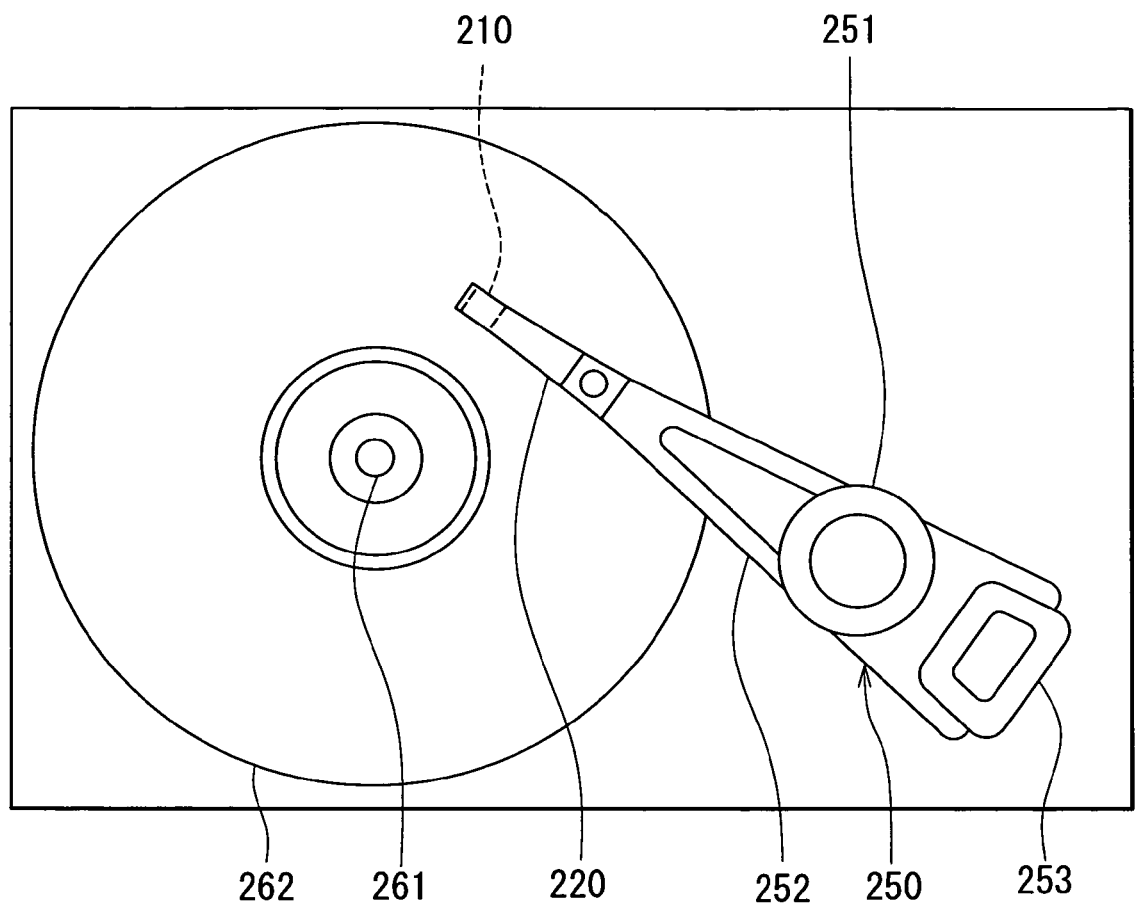
FIG. 7 is a top view of the magnetic disk drive incorporating the slider of FIG. 4.

Reference is now made to FIG. 6 and FIG. 7 to describe an example of the head stack assembly and the magnetic disk drive. FIG. 6 is a view for illustrating the main part of the magnetic disk drive. FIG. 7 is a top view of the magnetic disk drive. The head stack assembly 250 incorporates a carriage 251 having a plurality of arms 252. A plurality of head gimbal assemblies 220 are attached to the arms 252 such that the assemblies 220 are arranged in the vertical direction with spacing between adjacent ones. A coil 253 that is part of the voice coil motor is mounted on the carriage 251 on a side opposite to the arms 252. The head stack assembly 250 is installed in the magnetic disk drive. The magnetic disk drive includes a plurality of magnetic disk platters 262 mounted on a spindle motor 261. Two of the sliders 210 are allocated to each of the platters 262, such that the two sliders 210 are opposed to each other with each of the platters 262 disposed in between. The voice coil motor includes permanent magnets 263 disposed to be opposed to each other, the coil 253 of the head stack assembly 250 being placed between the magnets 263.

The actuator and the head stack assembly 250 except the sliders 210 correspond to the alignment device of the invention, and support the sliders 210 and align them with respect to the magnetic disk platters 262.

In the magnetic disk drive, the actuator moves the slider 210 across the tracks of the magnetic disk platter 262 and aligns the slider 210 with respect to the magnetic disk platter 262. The magnetic head incorporated in the slider 210 writes data on the magnetic disk platter 262 through the use of the write head and reads data stored on the magnetic disk platter 262 through the use of the read head.

The slider, the head gimbal assembly, the head arm assembly and the magnetic disk drive of the embodiment each of which incorporates the magnetic head of the embodiment exhibit effects similar to those of the magnetic head of the embodiment.

The present invention is not limited to the foregoing embodiment but may be practiced in still other ways. For example, the soft magnetic film of the invention is applicable not only to the pole layer of a thin-film magnetic head for perpendicular magnetic recording but also to the pole layer of a thin-film magnetic head for longitudinal magnetic recording.

The soft magnetic film of the invention is applicable not only to the pole layer of a thin-film magnetic head but also to soft magnetic films in general that are required to have a high saturation flux density and a low coercivity.

Obviously many modifications and variations of the present invention are possible in the light of the above teachings. It is therefore to be understood that within the scope of the appended claims the invention may be practiced otherwise than as specifically described.

What is claimed is:

1. A soft magnetic film made of an alloy whose principal elements are at least iron and nickel among the group consisting of iron, cobalt and nickel, wherein,
   when the total of iron, cobalt and nickel contents of the soft magnetic film is assumed as 100 weight percent, the iron content of the soft magnetic film is within a range of 42 to 90 weight percent inclusive, the cobalt content thereof is within a range of 0 to 48 weight percent inclusive, and the nickel content thereof is within a range of 10 to 20 weight percent inclusive,
   the soft magnetic film having a crystal structure that is a mixed crystal of a body-centered cubic structure phase and a face-centered cubic structure phase.

2. The soft magnetic film according to claim 1, wherein, when the total of the iron, cobalt and nickel contents of the soft magnetic film is assumed as 100 weight percent, a content of elements other than iron, cobalt and nickel in the soft magnetic film is 0.5 weight percent or lower.

3. A method of manufacturing a soft magnetic film, the soft magnetic film being made of an alloy whose principal elements are at least iron and nickel among the group consisting of iron, cobalt and nickel, wherein:
   when the total of iron, cobalt and nickel contents of the soft magnetic film is assumed as 100 weight percent, the iron content of the soft magnetic film is within a range of 42 to 90 weight percent inclusive, the cobalt content thereof is within a range of 0 to 48 weight percent inclusive, and the nickel content thereof is within a range of 10 to 20 weight percent inclusive, the soft magnetic film having a crystal structure that is a mixed crystal of a body-centered cubic structure phase and a face-centered cubic structure phase,
   the method comprising the step of manufacturing the soft magnetic film by performing electroplating using a plating current whose direction is alternately switched.

4. The method according to claim 3, wherein, when the total of the iron, cobalt and nickel contents of the soft magnetic film is assumed as 100 weight percent, a content of elements other than iron, cobalt and nickel in the soft magnetic film is 0.5 weight percent or lower.

5. The method according to claim 3, wherein the plating current is such one that a current in a first direction that functions so that the alloy precipitates at a cathode and a current in a second direction opposite to the first direction are alternately switched, and that a time quadrature value of the current in the first direction is greater than that of the current in the second direction.

6. A thin-film magnetic head comprising: a medium facing surface that faces toward a recording medium; a coil for generating a magnetic field corresponding to data to be written on the recording medium; and a pole layer allowing a magnetic flux corresponding to the field generated by the coil to pass therethrough, and generating a write magnetic field for writing the data on the recording medium, wherein:
   the pole layer incorporates a soft magnetic film made of an alloy whose principal elements are at least iron and nickel among the group consisting of iron, cobalt and nickel;

when the total of iron, cobalt and nickel contents of the soft magnetic film is assumed as 100 weight percent, the iron content of the soft magnetic film is within a range of 42 to 90 weight percent inclusive, the cobalt content thereof is within a range of 0 to 48 weight percent inclusive, and the nickel content thereof is within a range of 10 to 20 weight percent inclusive; and the soft magnetic film has a crystal structure that is a mixed crystal of a body-centered cubic structure phase and a face-centered cubic structure phase.

7. A method of manufacturing a thin-film magnetic head comprising: a medium facing surface that faces toward a recording medium; a coil for generating a magnetic field corresponding to data to be written on the recording medium; and a pole layer allowing a magnetic flux corresponding to the field generated by the coil to pass therethrough, and generating a write magnetic field for writing the data on the recording medium, the method comprising the steps of:

forming the coil; and forming the pole layer, wherein:

the pole layer incorporates a soft magnetic film made of an alloy whose principal elements are at least iron and nickel among the group consisting of iron, cobalt and nickel;

when the total of iron, cobalt and nickel contents of the soft magnetic film is assumed as 100 weight percent, the iron content of the soft magnetic film is within a range of 42 to 90 weight percent inclusive, the cobalt content thereof is within a range of 0 to 48 weight percent inclusive, and the nickel content thereof is within a range of 10 to 20 weight percent inclusive, and the soft magnetic film has a crystal structure that is a mixed crystal of a body-centered cubic structure phase and a face-centered cubic structure phase; and the soft magnetic film is manufactured by performing electroplating using a plating current whose direction is alternately switched.

8. A head arm assembly comprising: a slider including a thin-film magnetic head and disposed to face toward a recording medium; a suspension flexibly supporting the slider; and an arm for making the slider travel across tracks of the recording medium, the suspension being attached to the arm, the thin-film magnetic head comprising: a medium facing surface that faces toward the recording medium; a coil for generating a magnetic field corresponding to data to be written on the recording medium; and a pole layer allowing a magnetic flux corresponding to the field generated by the coil to pass therethrough, and generating a write magnetic field for writing the data on the recording medium, wherein:

the pole layer incorporates a soft magnetic film made of an alloy whose principal elements are at least iron and nickel among the group consisting of iron, cobalt and nickel;

when the total of iron, cobalt and nickel contents of the soft magnetic film is assumed as 100 weight percent, the iron content of the soft magnetic film is within a range of 42 to 90 weight percent inclusive, the cobalt content thereof is within a range of 0 to 48 weight percent inclusive, and the nickel content thereof is within a range of 10 to 20 weight percent inclusive; and the soft magnetic film has a crystal structure that is a mixed crystal of a body-centered cubic structure phase and a face-centered cubic structure phase.

9. A magnetic disk drive comprising: a slider including a thin-film magnetic head and disposed to face toward a recording medium that is driven to rotate; and an alignment device supporting the slider and aligning the slider with respect to the recording medium, the thin-film magnetic head comprising: a medium facing surface that faces toward the recording medium; a coil for generating a magnetic field corresponding to data to be written on the recording medium; and a pole layer allowing a magnetic flux corresponding to the field generated by the coil to pass therethrough, and generating a write magnetic field for writing the data on the recording medium, wherein:

the pole layer incorporates a soft magnetic film made of an alloy whose principal elements are at least iron and nickel among the group consisting of iron, cobalt and nickel;

when the total of iron, cobalt and nickel contents of the soft magnetic film is assumed as 100 weight percent, the iron content of the soft magnetic film is within a range of 42 to 90 weight percent inclusive, the cobalt content thereof is within a range of 0 to 48 weight percent inclusive, and the nickel content thereof is within a range of 10 to 20 weight percent inclusive; and the soft magnetic film has a crystal structure that is a mixed crystal of a body-centered cubic structure phase and a face-centered cubic structure phase.

* * * * *